Patented July 25, 1950

2,516,548

UNITED STATES PATENT OFFICE 2,516,548

PRODUCTION OF ANATASE TITANIUM DIOXIDE PIGMENTS

Winfred J. Cauwenberg, Piney River, and Charles A. Tanner, Jr., Amherst, Va., assignors to American Cyanamid Company, New York, N. Y., a corporation of Maine No Drawing. Application September 25, 1945, Serial No. 618,576

4 Claims. (Cl. 23—202)

This invention relates to the manufacture of titanium dioxide pigments and more particularly to a method of producing anatase titanium dioxide pigments of improved tinting strength which are particularly well suited for use in paint enamels.

In the usual method for the manufacture of titanium dioxide pigments a hydrated titanium dioxide which may contain small amounts of combined or adsorbed sulfuric acid is precipitated by the thermal-hydrolysis of sulphate solutions containing iron and titanium. The hydrated titanium dioxide so obtained is filtered out, washed, and calcined in the presence of an alkali metal compound such as a potassium salt which acts as a conditioning or mineralizing agent. The usual procedure is to mix the titanium dioxide with from about 0.2% to about 1.0% of potassium carbonate and calcine at temperatures of about 900 to 1050° C. for a period of time sufficient to develop fully pigment properties in the titanium dioxide.

The titanium dioxide produced by this method is predominantly of anatase crystal structure, one of the three crystal modifications (anatase, brookite, rutile) in which titanium dioxide occurs. It is known that the normal anatase structure obtained by the calcination of titanium dioxide produced by the hydrolysis of titanium sulphate can be converted partly or completely to rutile by continued calcination at temperatures above about 1050° C. Such calcination, however, causes crystal growth and discoloration and results in a product that is undesirable for use as a white pigment.

Within recent years it has also been shown that small amounts of alkali metal compounds, in addition to their function as a mineralizing or conditioning agent, also have a strong tendency to inhibit the conversion of anatase to rutile at temperatures below about 1100° C. Accordingly in U. S. Patent No. 2,273,431 a process of producing rutile titanium dioxide pigment is described which is based on the recalcination of a fully developed anatase titanium dioxide pigment after removing the alkali metal compounds therefrom. This is accomplished by subjecting a titanium sulphate hydrolysate to an initial calcination at the usual temperatures of about 800 to 1100° C. in the presence of a small amount of an alkali metal compound such as potassium carbonate or potassium sulphate and continuing the calcination until a fully developed anatase titanium dioxide pigment is obtained, then dispersing the pigment in water by grinding it with the aid of a deflocculating agent such as caustic soda, coagulating and filtering the resulting slurry, washing the filter-cake substantially free from alkali metal compounds and again calcining at temperatures of about 900–1100° C.

As is stated above, the present invention deals with the production of anatase titanium dioxide pigments of improved color, tinting strength and hiding power, and is not directed to the manufacture of rutile titanium dioxide pigments. In fact, one important feature of the invention is the deliberate retention in the titanium dioxide, or the addition thereto if not already naturally present, of compounds which will prevent the anatase titanium dioxide from converting to rutile during calcination.

We have discovered that anatase titanium dioxide pigments of much improved hiding power and tinting strength can be obtained when the hydrated titanium dioxide is first roasted in the presence of a fusible alkali metal compound such as potassium carbonate in amounts up to about 2% or more based on the weight of the titanium dioxide at a temperature and for a time sufficient to convert the titanium sulphate hydrolysate to small anatase crystals but insufficient to develop pigment properties therein. In accordance with the process of our invention the alkali metal compound is then removed from the anatase titanium dioxide and the material is calcined at temperatures and for a time sufficient to develop fully the pigment properties of the anatase crystals formed during the preliminary roasting, but the calcination is carried out under conditions such that substantially none of the anatase is converted to rutile.

By operating in this manner we retain the advantage of the conditioning or mineralizing action of the alkali metal compound during the initial formation of the anatase titanium dioxide crystals. However, we have found that the presence of fusible alkali metal compounds in the final calcination, during which the pigment properties of the anatase crystals are fully developed, has an adverse effect on the tinting strength of the finished pigment, and that anatase pigments of considerably better tinting strength are obtained when the alkali metal compound is removed before the final calcination is completed.

Another important feature of our invention is the discovery that certain definite quantities of phosphates such as compounds of $P_2O_5$ with calcium or with other materials naturally present in the titanium ore are very desirable aids in the process. Although phosphates are frequently present in titanium ores and minute quantities thereof sometimes find their way into titanium oxide pigments they have previously been regarded as undesirable impurities. We have found, however, that in the process of our invention the presence of phosphates in amounts corresponding to about 0.4% to about 0.8% of $P_2O_5$ will accomplish several important purposes. First and foremost, we find that the presence of these quantities of combined $P_2O_5$ will tend to delay or inhibit the conversion of anatase $TiO_2$ to rutile, so that the final calcination can be carried out at higher temperatures or for longer periods of time, if desired, without fear of rutile conversion with its resulting crystal growth and discoloration. Secondly, we have also found that titanium sulphate hydrolysates containing 0.45–0.55% or more of combined $P_2O_5$ are more readily dispersible in water after the first or preliminary roasting, so that it is unnecessary to add an alkaline deflocculating agent. For these reasons, the presence of about 0.4–0.8% of $P_2O_5$ in the titanium dioxide during our process constitutes an important feature of the invention.

As is noted above some titaniferous ores naturally contain calcium phosphate or other compounds of phosphorous in amounts sufficient to produce a content of 0.4%–0.8% of $P_2O_5$, based on the weight of $TiO_2$ in the titanium sulfate hydrolysate. We believe that the phosphate is precipitated as a titanium phosphate during the hydrolysis. When using ores containing little or no $P_2O_5$, such as the well-known Travancore ilmenite, phosphoric acid may be added to the washed titanium sulphate hydrolysate if desired, or it may be added after the preliminary roasting and washing if it is to be used only in the final calcination. In either case the phosphate content is converted to an alkali metal meta- or pyrophosphate upon roasting with water-soluble alkali metal compounds such as $K_2CO_3$. This feature of the invention, in its broader aspects, therefore includes the presence of the requisite quantities of combined $P_2O_5$ either during the preliminary roasting or during the final calcination in the substantial absence of fusible alkali metal compounds, or both.

The process of our invention therefore comprises as a first important feature the preliminary roasting of a titanium sulphate hydrolysate in the presence of a fusible alkali metal compound in amounts of about 0.2–2% or slightly more, under conditions such that the hydrous titanium dioxide is dehydrated, absorbed or adsorbed sulphur trioxide ions are converted to easily removable sulphates, and the titanium dioxide is converted to anatase crystals which are too small to possess pigment properties but which have a particle size sufficiently large to allow the second calcination to be made at low flux without sintering. This preliminary roasting is preferably carried out with a relatively high content of fusible alkali metal compound such as potassium carbonate on the order of 1–2% of the titanium dioxide, and consequently no rutile is formed. Roasting temperatures of 700–950° C. can therefore safely be employed. When using this range the optimum degree of anatase crystal formation is usually obtained in about 1–2 hours. The degree of roasting can be followed conveniently by determining the pH of the material, which should be above 4.5 and preferably between 5.5 and 6.0 when the preliminary roasting is completed. This produces a crystalline material of fine particle size which is readily dispersible in water without the necessity of adding alkaline deflocculating agents.

The roasted product is dispersed in water, preferably to 20% solids content, and is washed until the alkali metal salts are substantially completely removed. Either prior to or during the washing a small amount of an acid such as hydrochloric or sulphuric acid may be added to cause flocculation, thereby facilitating filtering and washing of the material. The washed product is dried, ground and is then ready for the final calcination.

A further important feature of our invention resides in the control of the second or final calcination to avoid any substantial conversion of the anatase crystals to rutile. As is noted above, the principal purpose of this final calcination is to develop fully the pigment properties of the anatase crystals formed during the preliminary roasting, as the uncontrolled conversion of any substantial proportion of these crystals to rutile would result in a coarse product of low dispersibility in paint vehicles and of poor color. Accordingly, in treating a titanium dioxide product from the first roasting which contains 0.35% or less of $P_2O_5$ the time and temperature of roasting is controlled carefully to avoid rutile formation. Preferably the roasting is carried out at temperatures not substantially higher than 975° C. for 4 to 5 hours.

When the titanium dioxide crystals from the preliminary roasting process contain 0.4% or more of $P_2O_5$ a wider range of temperature conditions can be employed in the roasting process without danger of rutile formation. Temperatures of 1000° or slightly higher can be used with safety, and with a corresponding reduction at the time of calcination, although of course lower temperatures on the order of 900–975° C. may be employed if desired.

The calcination is preferably carried out continuously in a rotating horizontal kiln which is heated at the discharge end and in which therefore there is a gradual temperature change from one end of the kiln to the other; the above temperatures represent those at the discharge end of the kiln.

The calcined pigment may be either simply dry milled or wet milled and hydroclassified, treated with the usual reagents, filtered, dried and disintegrated in accordance with present known procedures. The final product is an anatase pigment of much improved hiding power and tinting strength and of good dispersibility in paint vehicles. Its color is excellent and has the desirable bluish cast that is particularly valuable in paint enamels. Its tinting strength is about 15% higher than that of anatase titanium dioxide pigment produced by the ordinary methods outlined above.

The invention will be further illustrated by the following specific examples to which, however, it is not limited.

*Example 1*

A thoroughly washed aqueous pulp of a hydrated titanium dioxide obtained by thermal hydrolysis of a titanium sulfate solution, and containing 200 grams of titanium dioxide, is mixed with a concentrated aqueous solution containing 4 grams of potassium carbonate. The mixture is dried and roasted for one hour at a temperature of 850–875° C. The roasted product, having a pH of about 5.5, is then milled and slurried in water to a 20% solids content. 3½ cc. of commercial 22° Bé. hydrochloric acid are added, and the slurry is filtered and washed substantially free of alkali metal salts, dried and calcined 4 to 5 hours at a temperature of about 975° C.

Example 2

A thoroughly washed aqueous pulp of a hydrated titanium dioxide obtained by thermal hydrolysis of a titanium sulfate solution, and containing 200 grams of titanium dioxide, is mixed with a concentrated aqueous solution containing 4 grams of potassium carbonate. The mixture is dried and roasted for one hour at a temperature of 850–875° C. The roasted product, having a pH of about 5.5, is then slurried in water, wet milled in a pebble mill, and diluted to 20% solids content. The slurry is filtered and washed first with pure water and then with an 0.3% solution of sulfuric acid until the solids are substantially free of alkali metal salts. The filter cake is dried and calcined for from 4 to 5 hours at a temperature of about 975° C.

Example 3

Ferrous titanate obtained by tabling a crushed Nelsonite ore and having a $P_2O_5$ content of 0.2–0.3% was reacted with sulfuric acid and converted into a titanium sulfate solution which was subjected to thermal hydrolysis in the usual manner. The resulting pulp of hydrated titanium dioxide, after thorough washing, contained 0.6% $P_2O_5$ based on the total solids present.

A quantity of this pulp containing 200 grams of titanium dioxide was mixed with a concentrated aqueous solution containing 4 grams of potassium carbonate and the mixture was dried and roasted for one hour at a temperature of 850–875° C. The product at this stage of the calcination was found to contain a large number of small crystals of anatase, the pigment properties of which were undeveloped. Its pH was about 5.5, and it was readily dispersible in water.

The roasted product was slurried in water to a 20% solids content after which 3.5 cc. of commercial 22° Bé. hydrochloric acid were added to flocculate the solids to a readily filterable condition. The slurry was then filtered, washed substantially free of alkali metal salts, and dried. The dried product, which contained 0.5% of $P_2O_5$, was milled for final calcination.

After this preliminary treatment the material was calcined to develop fully the pigment properties in the anatase crystals previously formed during the preliminary roasting. This was accomplished by heating it at about 975° C. for 4–5 hours.

Examination of the calcined product by X-ray analysis showed it to be anatase containing no rutile. After wet milling, classifying and finishing the product by the usual procedures a pigment was obtained which had about 15% higher tinting strength than standard anatase pigments. Its dispersibility and color were excellent, the color in particular showing the bluish cast that is desirable in paint enamels.

Example 4

Another sample of the ferrous titanate described in Example 3 was leached to reduce its $P_2O_5$ content and was then converted into a titanium sulfate solution which was hydrolyzed and washed in the usual manner. The washed pulp contained 0.3% of $P_2O_5$ based on the total solids present. The pulp was treated with 0.75% of potassium carbonate, dried, and roasted for one hour at 850–875° C. as in Example 1.

The roasted product was not readily dispersible in water; therefore 0.2% of sodium hydroxide was added to the water and the product was ground in a ball mill. After grinding the dispersion was flocculated by adding magnesium sulfate and neutralized with sulfuric acid to a pH of 7, after which it was filtered, washed substantially free of water-soluble salts, dried and ground. The content of $P_2O_5$ was then below 0.2%.

Upon calcining the treated material at 975° C. for about 4 hours, wet milling, classifying and finishing as in Example 1 a rutile pigment of poor color and poor dispersibility was obtained. Its color was that which is generally rated "off brown," being a white which has a definitely dirty cast toward the greyish brown although it is still definitely a white. While it would serve as a white in an outside house paint its color is too poor for use in paint enamels. Its tinting strength was about the same as that of commercial anatase pigments.

Example 5

A 200 gram sample of the roasted, washed and dried but uncalcined intermediate product of Example 4, having a $P_2O_5$ content of slightly less than 0.2%, was impregnated uniformly with 14 grams of a 5% $H_3PO_4$ solution and again dried. The sample was then calcined at 975° C. for about 5 hours. On examination the calcined product showed no rutile structure, but formed an anatase pigment having a distinctly better color than the product of Example 4.

Example 6

A 200 gram portion of the washed hydrated titanium dioxide pulp described in Example 3, containing 0.6% of $P_2O_5$, was treated with 2% of $K_2CO_3$, roasted at 850–875° C. for one hour, slurried in water, flocculated with hydrochloric acid and filtered, washed, dried and ground as described in that example. It was calcined at 1000–1050° C. for about 1–2 hours. Although the color and dispersibility of the resulting pigment were poorer than in the product of Example 1, due to the higher calcination temperature, its crystal form was definitely anatase and no appreciable amount of rutile was produced.

This is a continuation-in-part of our copending application, Serial No. 429,117, filed January 31, 1942, now abandoned.

What we claim is:

1. A method of producing anatase titanium dioxide pigments of high tinting strength which comprises adding to a titanium sulfate hydrolysate having a phosphate content corresponding to about 0.6% of $P_2O_5$ about 1–2% of an alkali metal compound, converting the hydrated titanium dioxide to small anatase crystals having no pigment properties by roasting it at 700°–950° C. and terminating the roasting when the pH is between 4.5 and 6.0, dispersing the roasted product in water and acidifying and washing it to remove substantially the entire alkali metal salt content therefrom, and then developing pigment properties in the anatase titanium dioxide crystals without substantial conversion thereof to rutile by calcining them at temperatures not substantially above 1000° C. all percentages being based on the weight of the titanium dioxide.

2. In a method for the production of anatase titanium dioxide pigments of high tinting strength by a process including the steps of roasting a titanium sulfate hydrolysate with a small amount of an alkali metal compound at 700°–950° C. and terminating the roasting when the pH is between 4.5 and 6.0, dispersing the roasted product in water and washing it free from alkali metal salts, and calcining the product to an anatase titanium dioxide pigment at temperatures not substantially above 1000° C., the method of obtaining a water-dispersible product from the preliminary roasting step which comprises including a phosphate in the titanium sulfate hydrolysate in amounts corresponding to 0.45–0.55% of $P_2O_5$, based on the weight of the titanium dioxide.

3. A method of producing anatase titanium dioxide pigments of improved tinting strength which comprises roasting a titanium sulfate hydrolysate containing a small amount of an alkali metal compound at a temperature and for a time sufficient to convert the hydrolysate to small anatase crystals but insufficient to develop pigment properties therein and then removing the alkali metal from the anatase titanium dioxide and calcining it at temperatures of about 900° C. to 1050° C. in the presence of a quantity of phosphate corresponding to at least 0.4% and not more than about 0.8% of $P_2O_5$, based on the weight of the titanium dioxide.

4. A method of producing anatase titanium dioxide pigments of improved tinting strength which comprises roasting a titanium sulfate hydrolysate having a phosphate content corresponding to about 0.6% of $P_2O_5$ with about 1–2% of its weight of potassium carbonate at a temperature and for a time sufficient to convert the hydrolysate to small anatase crystals but insufficient to develop pigment properties therein, then washing the roasted product substantially free from potassium salts while retaining therein an amount of phosphate corresponding to at least 0.4% of $P_2O_5$ all quantities being based on the weight of the titanium dioxide, and then developing pigment properties in the anatase titanium dioxide crystals by calcining them at 900–1050° C.

WINFRED J. CAUWENBERG.
CHARLES A. TANNER, Jr.

REFERENCES CITED

The following references are of record in the file of this patent:

UNITED STATES PATENTS

| Number | Name | Date |
|---|---|---|
| 1,820,988 | Ryan | Sept. 1, 1931 |
| 2,055,221 | Ravnestad | Sept. 22, 1936 |
| 2,131,841 | Lyons | Oct. 4, 1938 |
| 2,273,431 | Booge | Feb. 17, 1942 |
| 2,307,048 | Keats | Jan. 5, 1943 |
| 2,358,167 | Keats et al. | Sept. 12, 1944 |

FOREIGN PATENTS

| Number | Country | Date |
|---|---|---|
| 360,436 | Great Britain | Nov. 2, 1931 |
| 392,194 | Great Britain | May 9, 1933 |